United States Patent Office 3,717,519
Patented Feb. 20, 1973

3,717,519
POLYACRYLAMIDE THICKENED SLURRY EXPLOSIVE WITH PARTICULAR CROSS-LINKING COMBINATION
Harold W. Sheeran and Marcel H. Oriard, both of Box 33, Marshall, Wash. 99020
No Drawing. Filed June 30, 1970, Ser. No. 51,331
Int. Cl. C06b 1/04
U.S. Cl. 149—60         15 Claims

ABSTRACT OF THE DISCLOSURE

Water resistant gels produced by cross linking water soluble polyacrylamide resins in an aqueous nitrate solution.

BACKGROUND OF THE INVENTION

Field of the invention

In manufacturing slurry blasting agents it is commonly very important to produce a uniform and stable suspension of the liquid and non-explosive solid ingredients along with a desired amount of fine entrained air bubbles in order to obtain optimum density and reactivity. Slurry explosives require the same type of uniform stable suspension of the liquid and explosive solid ingredients for optimum performance. In addition, it is very important that the suspending medium, the liquid or continuous phase of the slurries, be stable for extended periods of time at all normally encountered storage and use conditions. Further, it is very desirable that this liquid phase must resist penetration or dilution by water when the slurry is loaded in drill holes prior to a blast. Failure to achieve these characteristics will result in adverse changes in the product during storage, transportation, and/or loading operations. Such adverse changes would be typified by: settling or stratification of the solid ingredients; separation of the liquid phase; loss of entrained air; and dilution or mixing with drill hole water. Any of these changes will result in impaired performance and even detonation or propagation failures.

The suspending medium is most frequently an aqueous ammonium nitrate or ammonium nitrate/sodium nitrate solution containing natural gums, such as guar gum and other galactomannans, or water soluble polymers such as polyacrylamides, hydroxyethyl cellulose, polyvinyl alcohol or the like either alone or in combination, and these components having been crosslinked to form the desired gel consistency.

Description of the prior art

Gels of these types are described in U.S. Pats. Nos. 3,072,509, 3,202,556, 3,097,120, 3,341,383, and 3,355,336. In the first two of these patents, the author discloses his method of crosslinking guar gum into a firm gel which effectively suspends slurry ingredients. More mobile, pourable gels, based on crosslinked polyacrylamides, were disclosed in 3,097,120. In this patent the author was able to effectively crosslink hydrolized polyacrylamides having a free acid content up to a maximum of 10%, which amount was found to be excessive. U.S. Pat. 3,341,383 discloses hydrolized polyacrylamide having a free acid content of from 15% to 40% effectively suspended the solid ingredients in the pourable slurry compositions of his invention, and further, this polymer was not crosslinked. Additionally, the compositions of that invention could contain a crosslinked guar gum. In U.S. Pat. 3,355,336 the patentee found that polyacrylamides with crosslinked galactomannan produced excellent pourable and stable slurries. They also found that polyacrylamides when used alone did not form stable or suitable gels, but had to be used as thickeners with crosslinked galactomannans.

SUMMARY OF INVENTION AND PREFERRED EMBODIMENTS

By an entirely new method, we have produced very stable and suitable crosslinked polyacrylamide gels, using hydrolized polyacrylamides having from 11% to 40% free acid content. These new reactions are very versatile, and at the same polyacrylamide content, rheological properties can be varied from tough rubbery gels to soft pourable and pumpable gels. Moreover, the gelation time can be widely varied and closed controlled, allowing for longer mix cycles to obtain maximum uniformity on the one hand, or on the other hand, fast reactions that will gel almost immediately while being pumped into a wet drill hole. The gels are very water resistant, and mix with water only with difficulty. The reactions are selectively compatible with such diverse slurry additives as alcohols, glycols, glycerol, urea, formamide, sulfur, aluminum, ferrosilicon, and many others. In the various types of slurry compositions evaluated, it was found that from .275% to .35% of polyacrylamide resin based on the total composition, was sufficient to obtain excellent properties in most instances.

Master mixes were made to facilitate evaluation of the numerous reactions studied. These were composed of 1000 gms. of aqueous ammonium nitrate solution, or ammonium nitrate/sodium nitrate solution, containing 6 or 8 gms. of polyacrylamide resin. Test reactions were carried out in tared 100 ml. wide mouth jars with lids into which 50.3 or 50.4 gms. of the master mix had been weighed. These approximately 55 gm. samples were set up with the expectation that the remaining 45 gms. would be composed of the solid ingredients of a 100 gm. slurry mix. The amount of each ingredient used in the subsequent tables can therefore be read directly as a weight percentage of a 100% formulation. The minor ingredients were measured into the sample bottles from standard solutions to the nearest .0025 ml. At times the master mixes also contained sodium bichromates, or alcohols (including polyhydric alcohols) but not in the same mix. It was found that the plain master mixes, those containing the chromates, or those containing the alcohols, were all completely stable and remained unchanged even after laboratory storage for periods of over 1 year. Their properties, at this stage, were essentially Newtonian, i.e. a semi thick liquid having physical properties like mineral oil and having no elastic properties and pouring easily though somewhat thickly.

The hydrolized polyacrylamide found most suitable has a molecular weight of from about 3 to 8 million, and is hydrolized to the extent that from about 11% to about 40% of the monomeric units have been hydrolized. The ammonium nitrate/.3% polymer master mixes had a pH of 5.5 to 6.5, and of the ammonium nitrate/sodium nitrate /.3% polymer master mixer, had a pH of 6.0 to 7.0, both at 25° C.

In the crosslinking process of the present invention, the polyacrylamide solutions of the master mixes are changed from semi-thick liquids to soft, pliable, elastic, easily pourable gels. The characteristics are such that the 55 gm. sample can be picked up from the jar on the end of a glass stirring rod, and will stretch out up to 30 inches long as it is being lifted. They show decided elastic and rebound properties, release cleanly from polyethylene and have strong internal cohesion, healing together quickly if torn or parted. To illustrate the water resistance of these gels, thin films cling tenaciously to the glass containers, and these cannot be simply rinsed or soaked out, but require strong brushing in water to remove them. The thicker crosslinked gel compositions have all of the same properties, but to a greater degree.

The new crosslinking reactions were divided into four types, discussed separately as follows:

Type "A"

In the most straightforward of the crosslinking reactions of this invention, it was found that if ethylene glycol is added to a master mix containing sodium bichromate, a very slow but progressive crosslinking was initiated. This reaction literally took days and even weeks to completely crosslink into a gel, and terminated only when one of the reactants was spent. It was determined that each of the ingredients (water, ammonium nitrate, polyacrylamide, chromate and "alcohol") had to be present for the reaction to "go," and that they must therefore react interdependently. The rate of reaction and the quality of the gels is strongly influenced by the amount of polymer, chromate and type of "alcohol" present. It was found that methanol, ethanol, diethylene glycol, propylene glycol and glycerol could all be substituted for the ethylene glycol with more or less comparable results, and that ammonium and potassium bichromates could replace the sodium bichromate. Two other polyacrylamides evaluated were found not to be satisfactory. By applying heat to these type "A" reactions, the gelation is speeded up many fold, and they thereby become practical for slurries in which the solid ingredients are not water soluble. At 140° F. to 180° F. the above generalized reactions will take place in from one to three hours.

Type "B"

The foregoing room temperature reactions can also be greatly accelerated by the addition of sodium, potassium, or ammonium arsenite, and very superior crosslinked gels will be formed. The arsenite appears to accelerate the crosslinking process by co-reacting with the chromate in the presence of the ethylene glycol. The reaction goes to the end point in from 30 minutes to slightly over 2 hours, depending on the formulation. In the subsequent discussion, ethylene glycol, sodium arsenite and sodium or ammonium bichromate will be mentioned most frequently, but keeping in mind that their previously mentioned alternates will work as well in most instances.

Type "C"

The arsenite reactions can be variously accelerated (but not otherwise improved) by the addition of aliphatic acids and hydroxy substituted aliphatic acids. Polyhydroxy substituted acids such as tartaric acid and glycolic acid are particularly effective, working best simply as an additive to type "B" reactions. It they are present in the proper amounts, crosslinking of the polyacrylamide will take place in as little as 5 minutes. However, these reactions require about 30% more polymer for gels of equal quality to type "B" gels.

Type "D"

Reactions of type "A" and type "B" can be further accelebrated to almost instantaneous by the addition of aromatic acids and hydroxy aromatic acids, particularly the polyhydroxy aromatic acids, both carboxylic and phenolic, and their polyhydroxy derivatives such as salts, amines, sulphonates, and the like. Typical of the aromatic polyhydroxy carboxylic acids would be gallic acid (3,4,5-trihydroxybenzoic acid) and tannic acid (gallic acid-3-monogalate). Quinic acid (p-dihydroxybenzene) and pyrogallic acid (trihydroxybenzene) are typical of the aromatic polyhydroxy phenolic acids, and 4,4'-thiodiresorcinol, and pyrogallosulfonphthalein are typical of the acid derivatives. These reactions are very strong and will tolerate high levels of additives that inhibit reactions of lesser tenacity. Quality and stability of these gels are excellent and subtsantially equal to type "B" gels at the same polymer content.

Some of the strongest type "D" reactions, like the type "A" reactions, will crosslink without the arsenite being present, but much more efficiently than type "A." The type "C" reactions are not strong enough to react efficiently without the arsenite. Again, some of the strongest type "D" reactions will also crosslink without the glycol being present, it is believed because the polyhydroxy aromatic acids supply enough reactive hydroxyl groups to supplant those of the glycol. The hydroxyl ions of the carboxyl group do not appear to be the most effective hydroxyl ions in accelerating these reactions. For example, polycarboxilic organic acids such as the aliphatic succinic acid (two carboxyl groups) and glutaric acid (three carboxyl groups) and the aromatic pyromellitic acid (four carboxyl groups) have only a moderate accelerating effect on the rate of reaction, though the gels are of excellent quality. On the other hand, those organic acids having one or more hydroxyl ions in addition to the carboxyl groups, are very effective in accelerating the reactions.

In all four of these types of reactions, there is an optimum level of each ingredient relative to each other ingredient, that must be maintained for crosslinked gels of the best quality and in the gelation time desired. If these proportions are not obtained, defective and unstable gels will result. Characteristic defects are of two main types: regression and syneresis. In the former, gelation progresses to vary degrees but stops short of the end point, then becomes thinner. In the latter defects, the reaction goes quickly, giving the appearance of a good crosslinked gel, but then the gel will continue to thicken, or "go over." Exudation will eventually follow, leaving the gel thick and weak. Both defects may also result from an incompatible additive. While regression shows up quickly, syneresis may take months to become apparent.

Type "A" laboratory formulations

Most of these reactions were carried out with ethylene glycol and methanol levels up to 20%. The following 100 gram test runs are illustrative.

TABLE I

| Test Sample Number | 21-1 | 21-2 | 21-3 | 21-4 | 21-5 | 21-6 | 21-7 |
|---|---|---|---|---|---|---|---|
| Sat'd. AN soln | 97.9 | 94.9 | 89.9 | 82.9 | 94.9 | 89.9 | 82.9 |
| Ethylene glycol | | 3.0 | 8.0 | 15.0 | | | |
| Methanol | | | | | 3.0 | 8.0 | 15.0 |
| Polyacrylamide | 2.0 | 2.0 | 2.0 | 2.0 | 2.0 | 2.0 | 2.0 |
| Na bichromate | 0.0 | 0.1 | 0.1 | 0.1 | 0.1 | 0.1 | 0.1 |
| Total | 100.0 | 100.0 | 100.0 | 100.0 | 100.0 | 100.0 | 100.0 |

These reactions were very slow, reaching what we now call the end point, a strong elastic gel, in the following order: 21-4, 40 hours; 21-3 and 21-7, 64 hours; 21-2 and 21-6, 90 hours; and 21-5, 120 hours. After 71 days, 21-1 which contained no ethylene glycol or methanol, had remained completely unchanged, with no sign of any reaction. Upon adding 8 gms. of ethylene glycol, the crosslinking reaction started and proceeded to the end point. It can be seen that the rates of reaction were strongly dependent on the amount and type of "alcohol" present. The rate of reaction and quality of the gel is also dependent on the amount of polymer and chromate used. Heating of other similar test samples to 140° F. to 180° F. resulted in strong elastic gels in 30 to 45 minutes.

Type "B" laboratory formulations

Reactions of type "B" are much more efficient, in that gelling time is greatly improved. Quality of the gels can be predetermined, gelation time controlled, and end points formulated in, to produce very stable gels. It can be seen from the following tables that it was necessary to establish definite ingredient levels, and that these must be within certain ratios to each other in order to obtain stable crosslinked polyacrylamide gels.

TABLE II

| | Sat'd. AN solution | PA[1] | Na[2] NaXL | NaAs[3] | AGEG[4] | Total gms. | Ratio PA/CR/As | Gel. time |
|---|---|---|---|---|---|---|---|---|
| 48-1 | 50.0 | .3 | .040 | .023 | 4.4 | 54.763 | 7.5/1/.56 | 10 min. |
| 48-2 | 50.0 | .3 | .020 | .023 | 4.4 | 54.743 | 15/1/1.15 | 20 min. |
| 48-3 | 50.0 | .3 | .010 | .023 | 4.4 | 54.733 | 30/1/2.3 | 40 min. |
| 48-4 | 50.0 | .3 | .005 | .023 | 4.4 | 54.728 | 60/1/4.6 | 80 min. |
| 48-8 | 50.0 | .3 | .005 | .01725 | 4.4 | 54.722 | 60/1/3.45 | 100 min. |
| 48-12 | 50.0 | .3 | .005 | .0115 | 4.4 | 54.717 | 60/1/2.3 | 120 min. |
| 48-16 | 50.0 | .3 | .005 | .00575 | 4.4 | 54.711 | 60/1/1.15 | 4 hrs. |

[1] Polyacrylamide. [2] $Na_2Cr_2O_7$. [3] $NaAsO_2$. [4] Anti-freeze grade ethylene glycol.

While the gels of 48–1 and 48–2 crosslinked quickly and appeared to be of excellent quality, they developed syneresis after 3 and 4 days respectively. 48–3 was still a strong thick gel after 5 days, but subsequently developed syneresis. 48–4 was a softer more elastic gel which proved to be completely stable in laboratory storage of over two years. Samples 48–8, 48–12 and 48–16 proved to be equally stable to 48–4, each one being of a slightly thinner character, 48–16 being the thinnest. In 48–1, 48–2 and 48–3, the reaction "went over" because the chromate level used was too high, relative to the polyacrylamide and the arsenite was too low.

Additional sets of samples were run to determine the optimum gel quality vs. the optimum time of crosslinking, at varying chromate/arsenite ratios. It was found that the fastest reactions did not usually produce the best quality gels. The one exception (see Table III) was at a ratio of polyacrylamide/chromate/arsenite of 60/1/6.0 at a polyacrylamide content of .3%. Here optimum quality and optimum gel time coincided. The samples crosslinked in 25 to 30 minutes, producing gels having excellent characteristics, and which proved to be stable for extended periods of time.

These arsenite reactions are fast enough to be used in production slurries, allowing ample time for mixing to the uniformity and density desired and still allowing them to be packaged by gravity flow before the gel is fully crosslinked. Gels having a polyacrylamide/chromate ratio of 40/1 and lower, tend to gel more quickly, producing increasingly stronger and thicker gels at the same polymer content. To bring the reactions to a definite end point, as the chromate is increased, the arsenite must also be increased proportionately. Gels having a polyacrylamide/chromate ratio of 50/1 and higher, particularly the range between 60/1 and 75/1, are of a softer and more elastic character and are more suitable for pourable and pumpable slurries. Ratios higher than 75/1 are even more suitable, but with the arsenite type of reaction, take successively longer to crosslink as this ratio is increased. For gels of the best quality, and having the most suitable gel times, chromate/arsenite ratios of from 1/4 through 1/9 seem to be superior, with 1/6.0 and 1/7.5 having been selected as near optimum for pourable slurries and at a polymer content of between 0.275% and 0.35%.

Typical laboratory gel formulations that would be very suitable for pourable production slurries are as follows:

TABLE III

| | I | Ratio | II | Ratio | III | Ratio |
|---|---|---|---|---|---|---|
| Sat'd. AN or AN/SN solution | 50.0 | | 50.0 | | 50.0 | |
| Polyacrylamide | 0.33 | 60 | 0.33 | 60 | 0.33 | 75 |
| Sodium bichromate | 0.0055 | 1 | 0.0055 | 1 | 0.0044 | 1 |
| Sodium arsenite | 0.033 | 6.0 | 0.0413 | 7.5 | 0.033 | 7.5 |
| Ethylene glycol | 4.4 | | 4.4 | | 4.4 | |
| Total | 54.7685 | | 54.7768 | | 54.7774 | |

Equally good gels, having better flow properties in cold weather can be made by using the AN/SN solution and by increasing the glycol content. Contents of 8.8% ethylene glycol do not affect the reaction or the quality or stability of the gels, and much higher levels can be tolerated, if desirable, as illustrated in Table I.

Type "C" laboratory reactions

General relationships derived in the study of the arsenite reactions of type "B" also apply to type "C" reactions. There are a number of significant differences however. Type "C" reactions crosslink faster when ammonium bichromate is used (possibly because of the relatively higher Cr content), and they also respond better to more highly concentrated acid, chromate and arsenite reagent solutions. The gels form faster at low polyacrylamide/chromate ratios of 40/1 and less, and are soft and elastic at chromate/arsenite ratios in the range of 1/1 to 1/7.5. Speed of reaction can be increased by reducing the arsenite content to levels below those employed in type "B" reactions. In the mono and dihydroxy substituted acids the arsenite/acid ratio of 1/.125 to 2/1 consistently appears to be optimum. These reactions require the presence of both the glycol and arsenite to be really effective. The stronger reactions will however, react slowly without the glycol, but the gels are always of better quality with the glycol present. These reactions are unsatisfactory if the arsenite is omitted.

Citric acid, which has 3 carboxyl groups and one additional hydroxal group, is not as effective in these reactions as tartaric acid which has 2 carboxyl groups and 2 additional hydroxal groups. Tartaric acid reactions having a polyacrylamide/chromate ratio higher than 60/1, tend to develop syneresis in slurries after only a few weeks at 85° F. The 30/1 and 40/1 ratios seem quite superior in this respect, being more stable as well as reacting faster.

Table IV lists a number of representative type "C" reactions which produced excellent stable crosslinked gels.

TABLE IV

| | 143-4 | Ratio | 120-8₂ | Ratio | 142-1₆ | Ratio | 150-44 | Ratio |
|---|---|---|---|---|---|---|---|---|
| Sat'd. AN solution | 50.0 | | 50.0 | | 50.0 | | 50.0 | 9 |
| Polyacrylamide | .4 | 40 | .3 | 30 | .4 | 40 | .4 | 90 |
| NH₄ bichromate | .01 | 1 | .01 | 1 | .01 | 1 | .0044 | 1 |
| Sodium arsenite | .0375 | 3.75 | .075 | 7.5 | .0375 | 3.75 | .0165 | 3.75 |
| Citric acid | .0192 | 1.92 | | | | | | |
| Tartaric acid | | | .0375 | 3.75 | .0186 | 1.86 | | |
| Glycolic acid | | | | | | | .0165 | 3.75 |
| Ethylene glycol | 4.4 | | 4.4 | | 8.0 | | 4.4 | |
| Total | 54.8667 | | 54.8225 | | 58.4661 | | 54.8374 | |
| Gel time, min | 30 | | 5 | | 10 | | 20 | |

The reactions of Table IV also work very well with ammonium nitrate/sodium nitrate solutions, and in comparable gelation times, simply by adjusting the arsenite content downwardly.

Type "D" laboratory reactions

Monohydroxy aromatic acids such as phenol (carbolic acid) and benzoic acid behave similarly to the monohydroxy aliphatic acids in these reactions. They again accelerate the reactions of type "B" to some extent, but are present, and with up to 20% of sulphur. Chromate/tannic acid ratios from 1/0.67 to 1/7.2 were tried, producing a wide variety of satisfactory cross-linked gels at polyacrylamide/chromate ratios from 40/1 to 320/1. The gels seem to be equally stable to those of type "B" reactions, while being considerably faster. Gels having a polymer/chromate ratio of 120/1 and higher are more suitable for pumpable and pourable slurries while those below 120/1 become increasingly thicker. Typical formulations are given below.

TABLE VI

|  | 139-5₁ | Ratio | 143-11₂ | Ratio | 143-11 | Ratio | 144-5₂ | Ratio |
|---|---|---|---|---|---|---|---|---|
| Sat'd. AN or AN/SN solution | 50.0 |  | 50.0 |  | 50.0 |  | 50.0 |  |
| Polyacrylamide | 0.5 | 40 | 0.14 | 160 | 0.40 | 160 | 0.40 | 160 |
| Amm. bichromate | 0.0125 | 1 | 0.0025 | 1 | 0.0025 | 1 | 0.0025 | 1 |
| Sodium arsenite |  |  | 0.0188 | 7.5 |  |  |  |  |
| Tannic acid | 0.0188 | 1.5 | 0.0034 | 2.16 | 0.0054 | 2.16 | 0.0080 | 3.2 |
| Ethylene glycol |  |  | 4.4 |  |  |  | 1.67 |  |
| Urea |  |  |  |  |  |  | 9.38 |  |
| Total | 50.5313 |  | 54.8267 |  | 50.4079 |  | 61.4605 |  |
| Gel time, min | (¹) |  | 15 |  | 5 |  | 20 |  |

¹ 45 seconds.

effective only at certain concentrations and require the presence of both the arsenite and glycol. The resultant gels rather than being pale blues, greens or clear in color as in all of the previous reactions, tend to be tan to brown and dark brown. These darker colors seem to be characteristic of the gels of type "D."

The polyhydroxy aromatic acids on the other hand are very strong accelerators for these reactions. They function well over a much wider range of chromate, arsenite, glycol and acid contents and selectively are compatible with quite high contents of such problem additives as formamide, urea and sulphur. Depending on the formulation, they can crosslink the polyacrylamide in times varying from 30 seconds to 1 hour and longer. While all of these will react effectively in the presence of both the arsenite and glycol, selectively, some will react faster with only the glycol being present and some reactions are equally fast or faster without either the arsenite or glycol. However, the gels are always superior if the glycol is present (even when only to the extent of 1%). The arsenite increases the term of stability. Some typical laboratory formulations are given below:

144-5₂ continuing urea, remain clear and otherwise unaffected at 25° F. having identical characteristics to the same formula at 70° F.

Pyrogallic acid and quionic acid are taken as representative of the aromatic polyhydroxy phenolic acids. Pyrogallic acid was investigated as an accelerator for the type "A" and "B" reactions over a wide range of formulations, and can be used effectively at much lower concentrations than any of the other accelerators investigated. Generally, ratios of polyacrylamide/chromate of 240/1 and lower seem best and particularly 160/1. Ratios of chromate/arsenite of 1/7.5 and less are very satisfactory. Chromate/pyrogallol ratios of 1/28 through 1/.125 function well in the proper formulations. Crosslinking times and gel quality can be closely controlled by suitable formulation. At polyacrylamide/chromate/arsenite ratios of 160/1/7.5, 80/1/7.5 and 40/1/7.5, soft, pliable, very elastic and stable gels can be made, using chromate/pyrogallol ratios of 1/.5, 1/.25, and 1/.125 respectively. The 160/1/7.5/.5 fully crosslinks in 10 minutes and the 40/1/7.5/.125 in 90 minutes, and the resulting gels are of equal quality and characteristics. By reducing the arsenite

TABLE V

|  | 139-4₁ | Ratio | 142-7₁ | Ratio | 144-2 | Ratio | 144-2₄ | Ratio |
|---|---|---|---|---|---|---|---|---|
| Sat'd. AN solution | 50.0 |  | 50.0 |  | 50.0 |  | 50.0 |  |
| Polyacrylamide | 0.5 | 40 | .4 | 160 | .4 | 160 | .4 | 160 |
| Amm. bichromate | 0.0125 | 1 | .0025 | 1 | .0025 | 1 | .0025 | 1 |
| Sodium arsenite |  |  | .0188 | 7.5 |  |  |  |  |
| Gallic acid | 0.0125 | 1 | .0033 | 1.3 | .0033 | 1.3 | .0033 | 1.3 |
| Ethylene glycol |  |  | 4.4 |  | 7.91 |  | 1.67 |  |
| Urea |  |  |  |  |  |  | 9.38 |  |
| Total | 20.5250 |  | 54.8246 |  | 58.3158 |  | 61.4558 |  |
| Gel time, min | (¹) |  | 16 |  | 5 |  | 15 |  |

¹ 30 seconds.

139-4₁ is a thick elastic gel suitable for conventional slurries, while the others are softer gels suitable for pourable or pumpable slurries. 144-2₄ has much improved cold weather characteristics and requires the glycol in order to form a stable gel in the presence of the urea. Generally, about a 1/1 ratio between the chromate and gallic acid appears to be near optimum. Though ratios from 1/6.7 to 1/.3 will form suitable crosslinked gels.

Tannic acid accelerated gels are much like the gallic acid types, though generally seem to have a slight edge on gel quality, and have a definitely wider range of compatibilities. Tannic acid seems most effective in the approximate ratio, chromate/tannic acid 1/2, and especially 1/2.16 to 1/3.20. It is compatible with at least 10% formamide and urea, with or without ethylene glycol being to a 1/3.75 ratio, the gel time is reduced by ⅓ and the gel is of equal quality and stability. Reaction times can be reduced to ⅓ by elimination of the arsenite altogether, but here the long term stability of the gels is impaired. Alternately the reaction time can be reduced by increasing the chromate/pyrogallol ratio.

Increasingly thicker and faster crosslinked gels can be formed at polyacrylamide/chromate/arsenite/pyrogallol ratios of 160/1/7.5/1, 80/1/7.5/1, and 40/1/7.5/1, all at the same polyacrylamide content. The 160/1 ratio takes 5 minutes to fully crosslink and the 40/1 ratio is almost instantaneous. Hydroquinone (quinic acid) performs similarily to pyrogallon; the gels have excellent stability, are of equal quality, but take longer to crosslink. Representative formulations are given in Table VII.

TABLE VII

|  | 142-10₂ | Ratio | 145-2 | Ratio | 145-2₃ | Ratio | 145-3₁ | Ratio | 147-2 | Ratio |
|---|---|---|---|---|---|---|---|---|---|---|
| AN or AN/SN solution | 50.0 | -------- | 50.0 | -------- | 50.0 | -------- | 50.0 | -------- | 50.0 | -------- |
| Polyacrylamide | .4 | 160 | .4 | 160 | .4 | 160 | .4 | 80 | .4 | -------- |
| Amm. bichromate | .0025 | 1 | .0025 | 1 | .0025 | 1 | .005 | 1 | .0025 | 160 |
| Sodium arsenite | .0188 | 7.5 | .0188 | 7.5 | .0188 | 7.5 | .0375 | 7.5 | .0188 | 1 |
| Pyrogallol | .0035 | 1.53 | .0025 | 1.0 | .0013 | .5 | .0006 | -------- | .125 | -------- |
| Hydroquinone | | | | | | | | | .0025 | 7.5 |
| Ethylene glycol | 4.4 | -------- | 4.4 | -------- | 4.4 | -------- | 4.4 | -------- | 4.4 | 1 |
| Total | 54.8248 | -------- | 54.8238 | -------- | 54.8226 | -------- | 54.8431 | -------- | 54.8238 | -------- |
| Gel time, min | 5 | -------- | 5 | -------- | 10 | -------- | 25 | -------- | 25 | -------- |

Pyrogallosulphonphthalein (pyrogallol red) is included in Table VII as representative for the group of polyhydroxy derivatives of the organic acids, which also selectively function in these reactions.

It is often desirable in field mixing applications where the slurry is mixed on the job site, that it be pumped into the drill holes and that it form a strong water resistant gel as it is being implaced. By suitable formula modifications, tartaric, glycolic, gallic, tannic and pyrogallic acids can be used as accelerators to react almost instantaneously for this application. General reactions of this type would have ratios of polyacrylamide/chromate/accelerator of 20–40/1/1.05–5.5, with or without arsenite and/or glycol, depending on the speed of reaction and stability desired.

Table VII lists six soft pourable slurries of different kinds, utilizing the four types of reactions discussed. The reactions of type "B" and "D" in particular seem to be very stable and are equally suitable and interchangeable in a great variety of slurry formulations, being compatible with most slurry ingredients.

are maintained at temperatures above the melting point of TNT. The absorption and adsorption of the melted liquid TNT is identical to the thorough impregnation achieved with fuel oil in ANFO compositions. However, when the TNT permeated prills are used to make the slurry, the prills that are dissolved, release a fine suspension of TNT particles throughout the liquid or continuous phase of the slurry, effectively sensitizing it. The remaining undissolved porous prills carry the TNT in the most intimate contact possible between a fuel and its oxidizer. Other explosive sensitizers can also be used, both liquid and solid, as long as the desired intimacy of distribution is maintained. This slurry represents a significant improvement over the prior art, in that more than 5% but less than 10% of explosive sensitizer or fuel is ample to produce a powerful explosive slurry having excellent water resistance and propagation characteristics, while at the same time substantially reducing the ingredient cost. This slurry is made pourable by using the type "D" reaction.

Having thus described our invention, we desire to secure by Letters Patent of the United States the following:

TABLE VIII

|  | 1 | 2 | 3 | 4 | 5 | 6 |
|---|---|---|---|---|---|---|
| H₂O | 17.30 | 17.80 | 16.70 | 12.50 | 13.30 | 14.90 |
| AN | 33.10 | 34.00 | 32.00 | 24.70 | 25.50 | ¹ 32.40 |
| SN | 12.80 | -------- | -------- | 9.10 | 9.80 | -------- |
| PA | 0.40 | 0.33 | 0.33 | 0.33 | 0.39 | 0.33 |
| XL | 0.01 | 0.0055 | 0.0055 | 0.0055 | 0.0065 | 0.0028 |
| As | -------- | 0.033 | 0.042 | 0.04 | 0.024 | 0.0097 |
| GYA | -------- | -------- | -------- | -------- | 0.012 | -------- |
| TNA | -------- | -------- | -------- | -------- | -------- | 0.049 |
| EG | 4.40 | 3.84 | 3.93 | 7.40 | 7.50 | 6.10 |
| TNT | 32. | -------- | -------- | -------- | -------- | -------- |
| Al | -------- | -------- | -------- | 5.00 | -------- | -------- |
| S | -------- | -------- | 8.00 | 8.00 | 10.00 | -------- |
| AN/W | -------- | 44.00 | 39.00 | 33.00 | 33.50 | ¹ 46.30 |
| Total, percent | 100 | 100 | 100 | 100 | 100 | 100 |
| Gel time, min | (²) | 60 | 45 | 30 | 15 | 7½ |
| VOD 3" | 18,990' | 10,403' | 11,748' | -------- | 11,530' | 13,106'/sec. |
| Density | 1.39 | 1.23 | 1.24 | -------- | 1.22 | 1.31 |

¹ AN/TNT. ² 3 hours.

Note.—AN=ammonium nitrate; SN=sodium nitrate; PA=polyacrylamide; XL=chromate; As=arsenite; GYA=glycolic acid; TNA=tannic acid; EG=ethylene glycol; TNT=trinitrotoluene; Al=aluminum; S=sulphur; AN/W=ammonium nitrate/wax impregnated; AN/TNT=ammonium nitrate/TNT impregnated. (Porous prills.)

Slurry #1 is illustrative of a conventional pourable slurry explosive containing explosive fuels or sensitizers, and in which the type "A" reaction was utilized. The #3, #4 and #5 are slurry blasting agents or NCN slurries, containing no explosive as such, and in which the type "B" reaction was utilized with aluminum and sulphur in addition. In these the undissolved porous prills of the solid phase were thoroughly impregnated with a wax as taught in U.S. Pat. 3,450,582. They, however, represent a substantial improvement over the compositions of that patent, in that these slurries are fluid and pourable, rather than the thicker plastic gels envisioned in that patent. This permits a much broader utilization and a much improved marketability.

The 5th example is a composite of the previous three, again utilizing the wax permeated prills as the main component of the solid phase, but using the quicker gelling type "C" reaction to give the desired characteristics. Number 6 is a new type of slurry explosive, heretofore undisclosed, in which the porous ammonium nitrate prills are thoroughly soaked through with molten TNT, while they 1. In a thickened water-bearing explosive consisting of inorganic oxydizing salt, fuel, water and thickening agent, the improvement, comprising:
    using as the thickening agent, a polyacrylamide cross-linked by the combined interaction with water soluble chromate and an accelerator selected from the group which consists of alcohols, arsenites, aliphatic acids and aromatic acids and mixtures thereof;
    said polyacrylamide having a molecular weight-range of from about 3 to about 8 million and hydrolized to the extent that from about 11% to 40% of the acrylamide units are hydrolized.

2. A composition of claim 1 wherein said water soluble chromate is selected from the group which consists of sodium, potassium and ammonium bichromates and the alcohol is selected from methanol, ethanol, ethylene glycol, propylene glycol, diethylene glycol and glycerol.

3. A composition of claim 2 where an accelerator of water soluble arsenite selected from the group which consists of sodium, potassium and ammonium arsenite is additionally included.

4. A composition of claim 2 wherein said acid is an hydroxy organic acid.

5. A composition of claim 3 wherein said acid is an organic acid.

6. A composition of claim 3 wherein said acid is an hydroxy organic acid.

7. A composition of claim 3 wherein said salt is the derivative of a polyhydroxy aromatic salt.

8. A composition of claim 4 wherein said hydroxy organic acid is selected from the group consisting of glycolic acid, tartaric acid, hydroquinone, pyrogallol, gallic acid and tannic acid.

9. A composition of claim 5 wherein said organic acid is selected from the group consisting of acetic acid, oxalic acid, succinic acid, carbolic acid and benzoic acid.

10. A composition of claim 6 wherein said hydroxy organic acid is selected from the group consisting of glycolic acid, tartaric acid, citric acid, tetrahydroxy acid, succinic acid, adipic acid, salicylic acid, hydroquinone, pyrogallol, gallic acid and tannic acid.

11. A porous aqueous slurry composition according to claim 3 consisting essentially of from about 30% to 80% of ammonium nitrate, from about 5% to 35% of sodium nitrate, from about 10% to 33% water, from about 5% to 40% of fuel, from about 1.25% to 0.3% of polyacrylamide, from about 0.1% to about 15% of ethylene glycol, in a weight ratio with respect to the polyacrylamide water soluble bichromate from about 20 to 1 to about 160 to 1, and in a weight ratio with respect to the bichromate a water soluble arsenite from about 1 to 1 to about 9 to 1.

12. An aqueous slurry composition of claim 11 which contains more than 5% but less than 10% of an explosive fuel intimately associated with the ammonium nitrate in both the liquid and solid phases.

13. A composition of claim 11 wherein said acid is an hydroxy organic acid.

14. A composition of claim 12 wherein said acid is an hydroxy organic acid.

15. The method of further accelerating the crosslinking of a composition of claim 2 which comprises heating the composition.

References Cited

UNITED STATES PATENTS

| | | | |
|---|---|---|---|
| 3,312,578 | 4/1967 | Craig et al. | 149—44 X |
| 3,485,686 | 12/1969 | Jessop et al. | 149—44 X |
| 3,574,011 | 4/1971 | Knight | 149—44 |

STEPHEN J. LECHERT, Jr., Primary Examiner

U.S. Cl. X.R.

149—41, 44, 61